(12) United States Patent
Dighe

(10) Patent No.: US 9,317,342 B2
(45) Date of Patent: Apr. 19, 2016

(54) CHARACTERIZATION OF WITHIN-DIE VARIATIONS OF MANY-CORE PROCESSORS

(75) Inventor: Saurabh Dighe, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 13/995,048

(22) PCT Filed: Dec. 23, 2011

(86) PCT No.: PCT/US2011/067194
§ 371 (c)(1),
(2), (4) Date: Jun. 17, 2013

(87) PCT Pub. No.: WO2013/095633
PCT Pub. Date: Jun. 27, 2013

(65) Prior Publication Data
US 2013/0318539 A1    Nov. 28, 2013

(51) Int. Cl.
G06F 1/32 (2006.01)
G06F 9/54 (2006.01)
G06F 9/48 (2006.01)

(52) U.S. Cl.
CPC ............. *G06F 9/54* (2013.01); *G06F 1/329* (2013.01); *G06F 9/4893* (2013.01); *Y02B 60/144* (2013.01)

(58) Field of Classification Search
CPC ............................... G06F 9/505; G06F 1/329
USPC ........................................................ 718/105
See application file for complete search history.

(56) References Cited

U.S. PATENT DOCUMENTS

| 7,131,081 | B2 * | 10/2006 | Wang et al. .................. 716/136 |
| 7,143,203 | B1 * | 11/2006 | Altmejd ......................... 710/16 |
| 7,254,812 | B1 | 8/2007 | Menezes |
| 7,882,369 | B1 * | 2/2011 | Kelleher et al. .............. 713/300 |
| 2003/0052752 | A1 * | 3/2003 | Hirabayashi .................. 333/205 |
| 2004/0199821 | A1 * | 10/2004 | Flautner et al. ................. 714/30 |
| 2008/0005537 | A1 * | 1/2008 | Apparao et al. .............. 712/220 |
| 2008/0028252 | A1 * | 1/2008 | Vera et al. .................... 713/503 |
| 2008/0082285 | A1 | 4/2008 | Samaan et al. |
| 2008/0282074 | A1 * | 11/2008 | Jacobowitz et al. ............. 713/1 |
| 2009/0007074 | A1 * | 1/2009 | Campion et al. ............. 717/124 |
| 2009/0021607 | A1 * | 1/2009 | Takenaka et al. ........ 348/231.99 |
| 2010/0169609 | A1 | 7/2010 | Finkelstein et al. |
| 2010/0228402 | A1 | 9/2010 | Mangione-Smith |
| 2011/0119672 | A1 * | 5/2011 | Ramaraju et al. ............ 718/102 |
| 2011/0296212 | A1 * | 12/2011 | Elnozahy et al. ............ 713/320 |
| 2012/0159496 | A1 | 6/2012 | Dighe et al. |

OTHER PUBLICATIONS

Dinghe et al., "Within-die variation-aware dynamic-voltage-frequency-scaling with optimal core allocation and thread hopping for the 80-core teraflops processor." Solid-State Circuits, IEEE Journal of 46.1 (2011): 184-193.*

(Continued)

*Primary Examiner* — Emerson Puente
*Assistant Examiner* — Charlie Sun
(74) *Attorney, Agent, or Firm* — Kenyon & Kenyon, LLP

(57) ABSTRACT

A system and method for operating a many-core processor including resilient cores may include determining a frequency variation map for the many-core processor and scheduling execution of a plurality of tasks on respective resilient cores of the many-core processor in accordance to the frequency variation map.

20 Claims, 5 Drawing Sheets

(56) References Cited

OTHER PUBLICATIONS

Bheling, et al., The POWER4 Processor Introduction and Tuning Guide, IBM Corp, 2001.*

Anselmi et al., pSeries 650 Model 6M2 Technical Overview and Introduction, IBM, 2003.*

International Search Report and Written Opinion issued on Apr. 25, 2012, for counterpart International Application No. PCT/US2011/067194.

Teodorescu et al., "Variation-Aware Application Scheduling and Power Management for Chip Multiprocessors," ISCA '08, Proceedings of the 35th Annual International Symposium on Computer Architecture, 2008, 12 pages.

\* cited by examiner

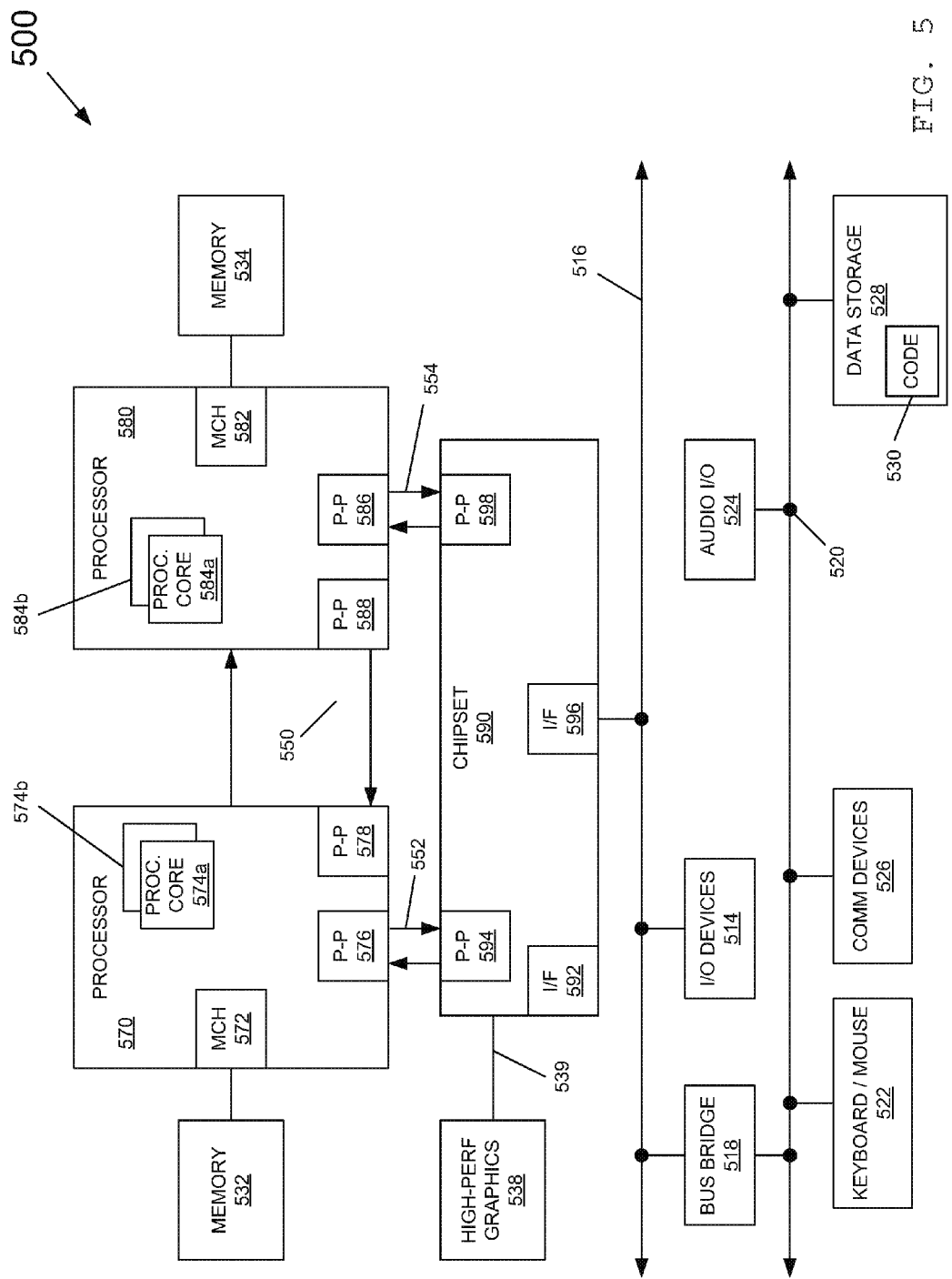

CHARACTERIZATION OF WITHIN-DIE VARIATIONS OF MANY-CORE PROCESSORS

FIELD OF THE INVENTION

The present disclosure pertains to many-core processors, in particular, to characterizing within-die variations of a many-core processors that include resilient cores.

BACKGROUND OF THE INVENTION

Many-core processors with on-die network-on-chip (NoC) interconnects are emerging as viable architectures for energy efficient high performance computing (HPC). Aggressive supply voltage scaling of these processors can result in higher energy efficiency. However this efficiency comes at the expense of processor performance loss. To compensate for this performance loss, many-core processors try to parallelize workloads across more cores. Future trends for energy efficiency expect more small cores integrated on a single die, larger die sizes for increased parallel performance, and lower operating voltages for increased energy efficiency. While technology scaling and the quest for increased energy efficiency have fueled the growth of many-core processors, the effects of core-to-core variations in maximum clock frequency (Fmax) and power leakage due to parameter variations among cores become significant.

To accommodate the variations among different cores in a many-core processor, current art runs the many-core processor according to the capacity of the least capable core to prevent causing errors during execution. For example, all of the cores on the many-core processor run at the maximum clock frequency (Fmax) of the slowest core so that all of the cores may safely execute codes. However, this approach does not use all of the cores to their full capacities, thereby resulting in sub-optimal energy efficiencies.

DESCRIPTION OF THE FIGURES

FIG. 5 is a block diagram of a system according to an exemplary embodiment of the present invention.

DETAILED DESCRIPTION

Figure 1:
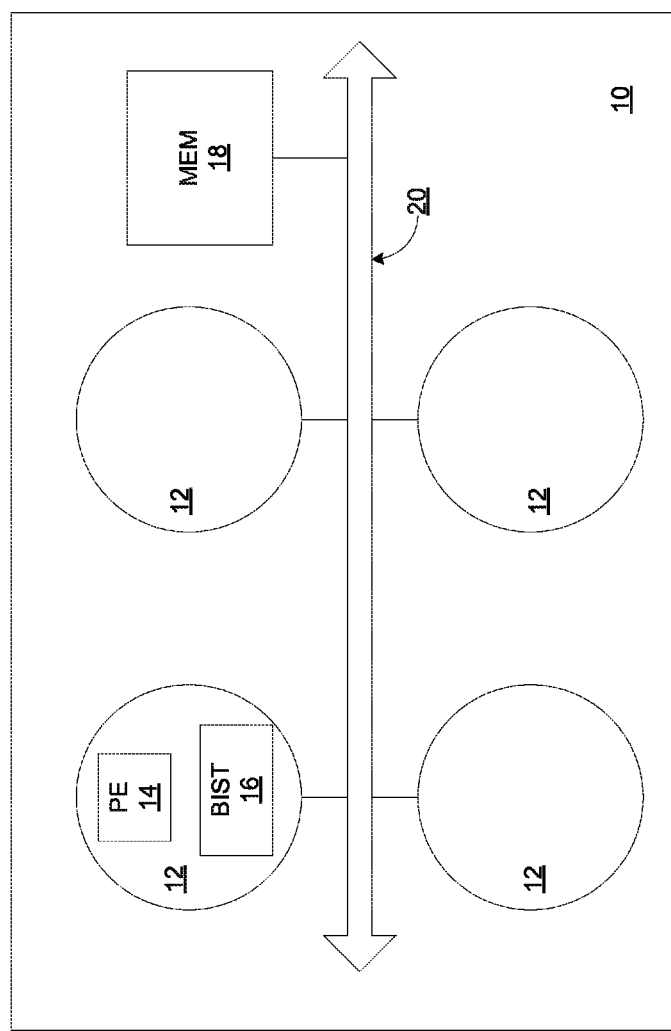
FIG. 1 illustrates a many-core processor according to an exemplary embodiment of the present invention.

U.S. patent application Ser. No. 12/972,985 ('985 application), entitled "Performing Variation-Aware Profiling and Dynamic Core Allocation for a Many-Core Processor," filed on Dec. 20, 2010, assigned to the same assignee, describes a variation-aware scheme that leverages within-die (WID) variations to improve processor performance while maintaining energy efficiency or improve energy efficiency while maintaining performance. To this end, the variation-aware scheme as described in the '985 application creates a schedule that maps software applications to an optimal set of cores based on a per-core frequency variation map for the many cores. The per-core frequency variation map may include the capabilities (such as maximum clock frequencies (Fmax)) of each core. For example, tasks such as virus detection that typically requires less computational resources may be executed on a slower core, while tasks such as scientific computing that typically requires intensive computational resources may be executed on faster cores.

The per-core frequency variation map as described in the '985 application is static in the sense that it is specified and stored in a memory as part of the processor before the processor is shifted to a customer. Thus, once the per-core frequency variation map is set for a many-core processor and the many-core processor is shifted to a customer, the per-core frequency variation map may not be further changed. The static per-core frequency variation map, however, cannot take into account dynamic parameter variations that occur through the lifetime of the many-core processor. Parameters (such as maximum clock frequency Fmax and power leakage profile) associated with each core may change due to supply voltage (Vcc) droops, environmental factors (such as temperature and humidity), or processor aging factors (such as different workloads with respect to different cores) during processor operation. To account for these changes, the many-core processor may include built-in clock frequency (Fclk) guardbands for sub-systems to ensure correct functionality during the worst scenarios. Thus, the schedule that is created based on the static per-core frequency variation map as described in the '985 application may not reflect the optimal mapping between applications and cores once the parameters characterizing each core have changed during the lifetime of a processor. Therefore, the operation of a many-core processor needs to take into consideration of these dynamic parameter changes for each core. For example, the many-core processor may run at a frequency even lower than the Fmax of the slowest core to provide tolerance margins for dynamic parameter changes. For these reasons, a static scheme for mapping applications to cores may not provide the optimal utilization of the many cores during the lifetime of a processor.

Recently, many-core processors that include resilient cores have been used to further improve the performance of a processor. A resilient core may include error detection circuitry and error control circuitry that may help the cores recover from errors occurring during operation. With the error recovery capability, the resilient core may consistently run at a high clock frequency despite the dynamic parameter variations caused by environmental and aging factors. Thus, although the error recovery operation is performed during recovery cycles, the resilient core still may maintain overall high performance because the advantage of running at a high clock cycle balances out the recovery cycles. The resilient cores may exploit dynamic parameter variations such as Vcc droops, temperature effects, and aging effects.

Embodiments of the present invention may advantageously use the error discovery and error control capability of resilient cores of a many-core processor to characterize the within-die variations. Embodiments of the present invention may dynamically create a per-core frequency variation map, under different environmental and aging conditions, so that a schedule may be created based on the customized per-core frequency variation map to maps applications to an optimal set of resilient cores. Therefore, each core in the many-core processor may run to the fullest capacity under different environmental and aging conditions.

Embodiments of the present invention may include a method for operating a many-core processor including resilient cores. The method may include determining a frequency variation map for the many-core processor and scheduling execution of a plurality of tasks on respective resilient cores of the many-core processor in accordance to the frequency variation map.

Embodiments of the present invention may include a many-core processor that includes resilient cores and a storage for storing a frequency variation map, in which a plurality of tasks is scheduled to execute on respective resilient cores of the many-core processor in accordance to the frequency variation map.

FIG. 1 illustrates a many-core processor according to an exemplary embodiment of the present invention. Referring to FIG. 1, a processor 10 may be a many-core processor including an NoC architecture that may contains N cores. Each core 12 may include a processing engine 14 connected to a router such as a 5-port router which is part of an interconnect fabric 20 for inter-core communication. In one embodiment, each processing engine may include two independent single-precision floating-point multiply-accumulator (FPMAC) units, instruction memory, and a data memory.

Each core 12 may be a relatively small core. In addition to processing circuitry, each core 12 may include a built-in self test (BIST) circuit 16 to aid in performing core characterization in accordance with an embodiment of the present invention. The BIST may be used for characterizing cores. Also in various embodiments, each core 12 may include a local memory (e.g., a cache memory) and further may be coupled to shared memory. Specifically, as shown in FIG. 1, a shared memory 18, which is a global shared memory, may be coupled to individual cores 12 via an interconnect fabric 20. Note that in some implementations, shared memory 18 may be distributed across the cores. The shared memory may be globally addressable and may be used to store the results of the characterization performed on each of the cores. For example, in one embodiment, data may be stored for each core regarding Fmax (e.g., at multiple voltages), leakage power (e.g., at multiple frequencies) and so forth. While not shown in FIG. 1 for ease of illustration, it is to be understood that processor 10 may include other components, such as input/output (I/O) interfaces, buses, memory controllers, other such controllers, logic and the like.

While shown with this particular implementation in the embodiment of FIG. 1, it is to be understood that the scope of the present invention is not so limited, and in other embodiments other configurations may be present, such as one-dimensional or three-dimensional meshes or one-dimensional, two-dimensional, or three-dimensional torus configurations, for example. Further, while shown with XY individual cores in the embodiment of FIG. 1, it is to be understood that many-core processors may include more or fewer such cores in different implementations.

Figure 2:
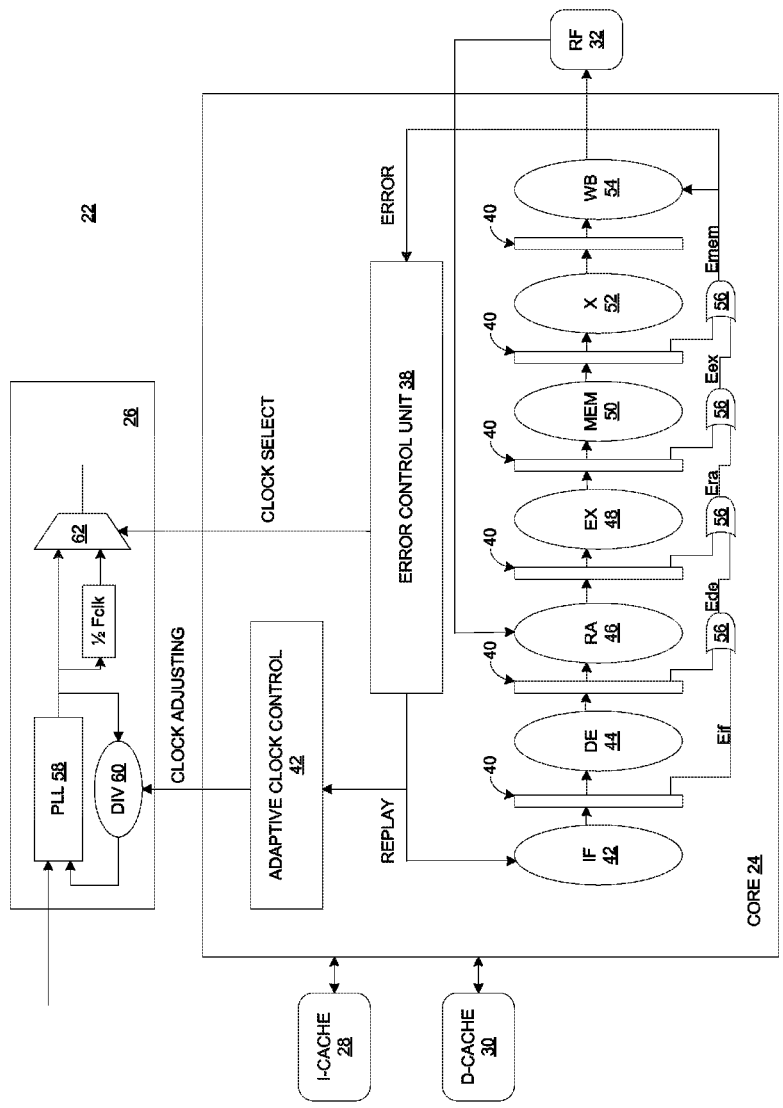
FIG. 2 illustrates the architect of a processor including a resilient core according to an exemplary embodiment of the present invention.

In a preferred embodiment, at least one of the cores 12 is a resilient core. FIG. 2 illustrates the architect of a processor including a resilient core according to an exemplary embodiment of the present invention. Referring to FIG. 2, a processor 22 may include at least one resilient core 24, a clock generator 26, an instruction cache 28, a data cache 30, and a register file 32. The instruction cache 28 and data cache 30 may be memory cells that store instructions and data, respectively. While the processor 22 may include an array of resilient cores (or tiles) connected through interconnect fabrics as shown in FIG. 1, for the convenience of illustration, FIG. 2 illustrates only one resilient core 24. The resilient core 24 may further include an instruction pipeline, an error control unit 38, and an adaptive clock control 42.

The instruction pipeline may be a 32-bit RISC (Reduced Instruction Set Computer), in-order pipeline that may include stages of instruction fetch stage (IF) 42, a decoder stage (DE) 44, a register access stage (RA) 46, an execute stage (EX) 48, a memory stage (MEM) 50, an exception (X) stage 52, and a write-back stage (WB) 54. Some of the seven stages may be associated with an error detection circuit 40 that may detect errors occurred at these stages. For example, the error detection circuit 40 may detect errors that may occur at IF 42, DE 44, RA 46, EX 48, and MEM 50, respectively. The detected errors may be combined by logic circuits 56 so that $E_{if}$ includes errors occurred at IF 42; $E_{de}$ includes $E_{if}$ and errors occurred at DE 44; $E_{ra}$ includes $E_{if}$ and $E_{de}$, and errors occurred at RA 46; $E_{ex}$ includes $E_{if}$, $E_{de}$, and $E_{ra}$, and errors occurred at EX 48; and $E_{mem}$ includes $E_{if}$, $E_{de}$, $E_{ra}$, and $E_{ex}$, and errors occurred at MEM 50. The stages X 52 and WB 54 may be designed with additional timing guard band to ensure that dynamic-variation timing failures do not occur at X 52 and WB 54 stages. The accumulated errors $E_{mem}$ from the first five stages (IF, DE, RA, EX, MEM) may be transmitted to the WB stage 54 which may then identify which preceding stages cause the error. Based on the accumulated error $E_{mem}$, the WB stage 54 may invalidate the instruction that causes the error. Further, the WB stage 54 may include control logic that prevents subsequent instructions from corrupting the architectural states of the resilient core. For example, WB stage 54 may temporarily delay the execution of subsequent instructions and suspend output to register file 32.

The accumulated error $E_{mem}$ may be concurrently transmitted to the error control unit 38 for error recovery based on replaying the errant instruction. The error recovery unit 38 may work collaboratively with the adaptive clock control 42 and the clock generator 26 to achieve error recovery. In response to detecting an error, the error recovery unit 38 may generate a replay signal and a clock select signal. The replay signal may be transmitted to the IF stage 42 (or the head of the instruction pipeline) and to the adaptive clock control 42. The clock select signal may be transmitted to the clock generator 26 to select between Fclk and ½ Fclk.

The replay signal may cause the errant instruction to be re-executed on the instruction pipeline. If the errant instruction executes correctly during the replay, the subsequent instructions may continue normal operations. The replay signal is also supplied to the adaptive clock control 42 which may include counters. A first counter in the adaptive clock control 42 may count a number of times that the replay fails. If the number of failures exceeds a predetermined threshold value, the adaptive clock control 42 may transmit a clock adjusting signal to the clock generator 26 to slow down Fclk. In one embodiment, the clock generator may include a phase-locked loop (PLL) 58 whose frequency may be adjusted downwards by a frequency divider 60. A second counter in the adaptive clock control 42 may accumulate a divisional factor based on the repeated failures to execute the errant instruction correctly. The adaptive clock control 42 may then transmit the divisional factor to the clock generator 26 to set the frequency divider 60 so as to decrease Fclk in accordance to the divisional factor. In this way, the resilient core 24 may run at a maximum frequency for high performance until a repeated error occurs. At that time, the core may be slowed down correspondingly until the error is cured.

Figure 3:
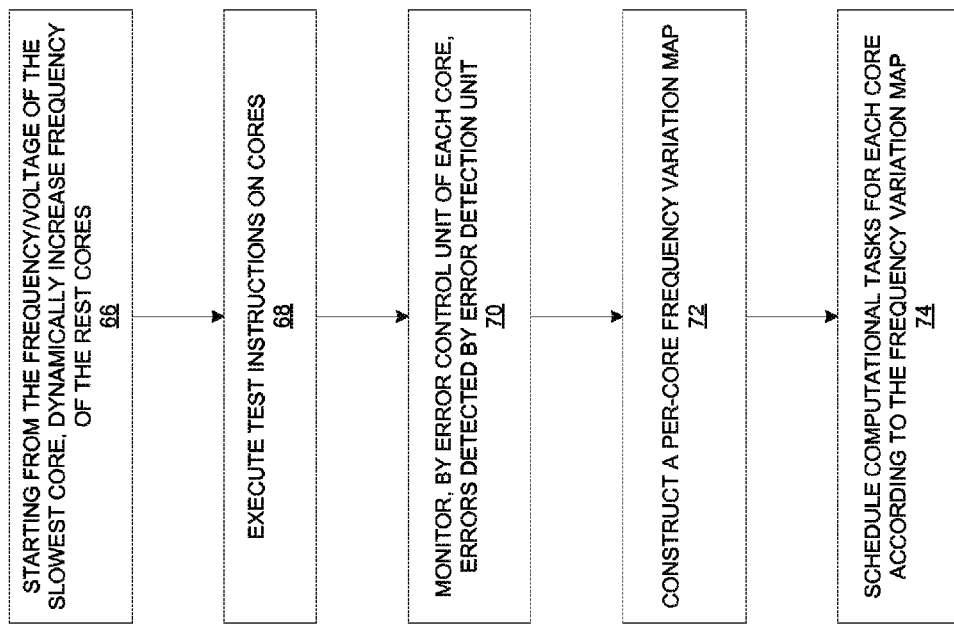
FIG. 3 illustrates a process to determine a per-core frequency variation map according to an exemplary embodiment of the present invention.

Embodiments of the present invention may take advantage of the properties of the resilient cores in a many-core processor to dynamically generate a per-core frequency variation map that may be used to create a schedule to map the capacity of each core with an optimal usage of the core. FIG. 3 illustrates a process to determine the per-core frequency variation map according to an exemplary embodiment of the present invention. Referring to FIG. 3, a controller may be used to execute steps as illustrated in FIG. 3. The controller may be one of the resilient cores of the many-core processor, or alternatively, a processor external to the many-core processor. At 66, the controller may, starting from a frequency/voltage ratio that is tolerable by the slowest core, dynamically increase the clock frequency for all of the resilient cores. The slowest core and its corresponding tolerable frequency/voltage ratio may be predetermined by the manufacturer of the many-core processor as an initial characterization of the many-core processor. The dynamic increase of frequency may be achieved by raising the clock frequency incrementally for the resilient cores. While at the raised frequencies, at 68, the controller may supply test instructions to the instruction pipeline of each of the resilient cores. At 70, the error control units 38 of each core may monitor whether errant executions may have occurred at each resilient core. If there is no error, the controller may further increase the clock frequency to a higher level for further testing. However, if an error occurs at a core, the controller may record the frequency/voltage ratio at which the error occurs for the particular core. These steps may be performed recursively until the maximum tolerable frequencies of all cores are determined. At 72, the controller may be configured to construct a per core frequency variation map that may help optimize the performance of the many-core processor. In one exemplary embodiment, the per-core frequency variation map may include a table that maps an index for each core to a maximum tolerable frequency/voltage ratio (FmaxV) for that core. The constructed per-core frequency variation map may be stored in a memory storage that is accessible by the many-core processor. Once the per-core frequency variation map is constructed and stored, at 74, the controller may be configured to schedule computational tasks for each core in the many-core processor according to the per-core frequency variation map. The scheduled tasks may be executed according to the schedule.

Figure 4:
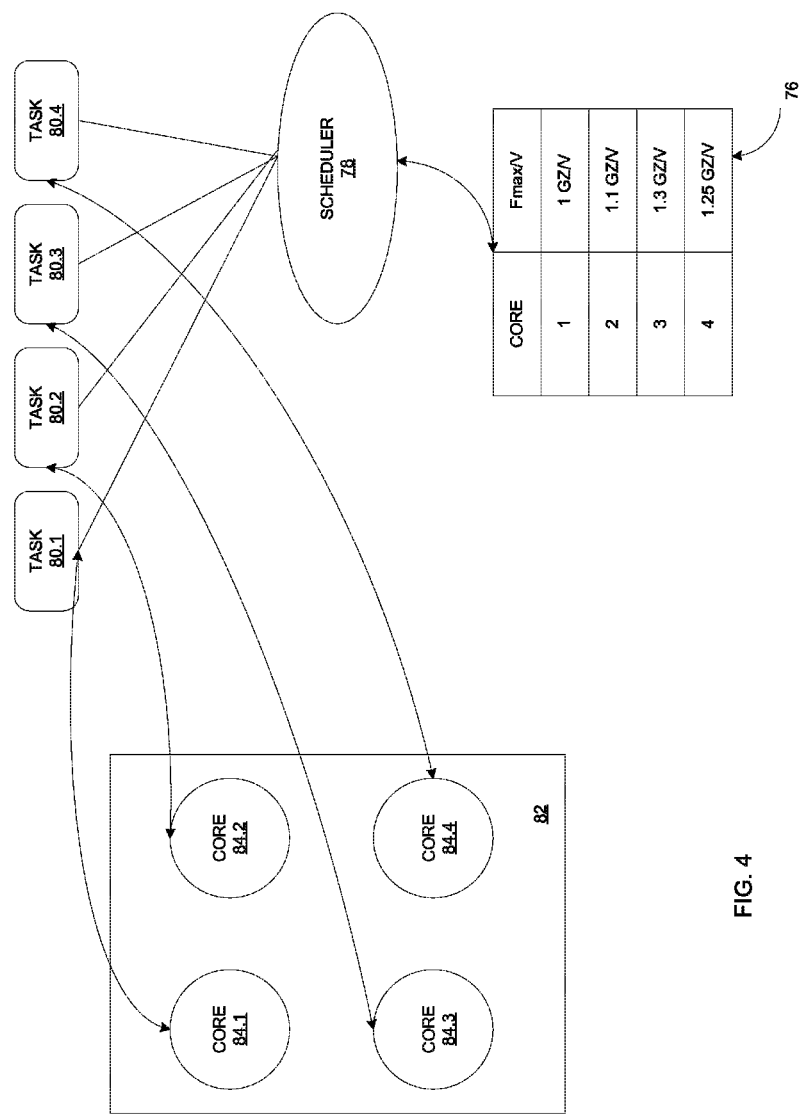
FIG. 4 is a diagram that illustrates the execution of computational tasks based on the per-core frequency variation map according to an exemplary embodiment of the present invention.

FIG. 4 is a diagram that illustrates the execution of computational tasks based on the per-core frequency variation map according to an exemplary embodiment of the present invention. Referring to FIG. 4, the many-core processor 82 may include a number of resilient cores 84.1-84.4 that may have varied capacities. As discussed above in conjunction with FIG. 3, a per-core frequency variation map 76 may have been constructed and stored in a memory storage. The per-core frequency variation map 76 may include a table that may map cores to their corresponding maximum tolerable Fmax. In the exemplary embodiment as shown in FIG. 4, the per-core frequency variation map 76 may map each of resilient cores 1-4 to a corresponding maximum Fmax/V. A scheduler 78 may, based on the per-core frequency variation map 76, to schedule the executions of tasks 80.1-80.4 on cores 84.1-84.4. For example, the computationally more intensive task 80.3 may be executed on the fastest core 84.3, while the computationally less intensive task 80.1 may be executed on the slowest core 84.1. Thus, the performance of the many-core processor 82 may be optimized according to the per-core frequency variation map 76.

Unlike a static mapping that is fixed before a processor is shipped to a customer, the per-core frequency variation map 76 may be dynamically determined during the lifetime of the many-core processor 82. In one embodiment, the per-core frequency variation map 76 may be determined prior to its deployment in the field to take into account the specific environmental factors of the field in the real world. The environmental factors may include usage patterns at the field. The per-core frequency variation map 76 may be determined using the process as illustrated in FIG. 3 in the field before deployment. In another embodiment, the per-core frequency variation map 76 may be periodically updated to take into account of different aging curves of the resilient cores. For example, the per-core frequency variation map 76 may be updated every six months. In yet another embodiment, the per-core frequency variation map 76 may be updated along with major changes in the system. For example, the per-core frequency variation map 76 may be updated if a software upgrade occurs, or if the machine is rebooted after a period of shutdown.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multi-core processors, including first and second processor cores (i.e., processor cores 574a and 574b and processor cores 584a and 584b), and potentially many more cores may be present in the processors. The processors each may perform variation-aware scheduling based on profile information obtained and stored in on-chip storage in accordance with an embodiment of the present invention to improve energy efficiency.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 5 as a multi-package system (with each package including a multi-core processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for operating a many-core processor including resilient cores, comprising:
   determining a frequency variation map for the many-core processor if there is an upgrade to a software application; and
   scheduling execution of a plurality of tasks on respective resilient cores from the resilient cores of the many-core processor in accordance to the frequency variation map,
   wherein the determining of the frequency variation map includes:
   dynamically increasing a clock frequency at which the resilient cores execute instructions;
   executing the instructions on the resilient cores;
   monitoring to determine at which clock frequency an error occurs at each resilient core from the resilient cores; and
   constructing the frequency variation map based on a maximum tolerable frequency/voltage ratio for each resilient core from the resilient cores.

2. The method of claim 1, further comprising:
   creating a schedule in accordance to the frequency variation map; and
   executing the plurality of tasks on the many-core processor in accordance to the schedule.

3. The method of claim 1, wherein at least one resilient core from the resilient cores includes an instruction pipeline, an error control unit, and an adaptive clock control.

4. The method of claim 3, wherein the instruction pipeline further includes pipeline stages, wherein at least one of the pipeline stages is guardband-protected.

5. The method of claim 3, wherein the error control unit generates a replay signal if the error control unit detects an occurrence of an error during executing an instruction on the instruction pipeline.

6. The method of claim 3, wherein the adaptive clock control, based on a number of repeated erroneous executions of an instruction, generates a clock adjusting signal to slow down a clock frequency generated by a clock generator.

7. The method of claim 1, further comprising determining the frequency variation map for the many-core processor every six months.

8. The method of claim 1, further comprising determining the frequency variation map for the many-core processor based on humidity.

9. A many-core processor, comprising:
   resilient cores; and
   a storage for storing a frequency variation map if there is an upgrade to a software application,
   wherein a plurality of tasks is scheduled to execute on respective resilient cores from the resilient cores of the many-core processor in accordance to the frequency variation map, and
   wherein the frequency variation map is determined by:
   dynamically increasing a clock frequency at which the resilient cores execute instructions;
   executing the instructions on the resilient cores;
   monitoring to determine at which clock frequency an error occurs at each resilient core from the resilient cores; and
   constructing the frequency variation map based on a maximum tolerable frequency/voltage ratio for each resilient core from the resilient cores.

10. The processor of claim 9, wherein the plurality of tasks are executed on the many-core processor in accordance to a schedule that was created in accordance to the frequency variation map.

11. The processor of claim 9, wherein at least one resilient core from the resilient cores includes an instruction pipeline, an error control unit, and an adaptive clock control.

12. The processor of claim 11, wherein the instruction pipeline further includes pipeline stages, wherein at least one of the pipeline stages is guardband-protected.

13. The processor of claim 11, wherein the error control unit generates a replay signal if the error control unit detects an occurrence of an error during executing an instruction on the instruction pipeline.

14. The processor of claim 11, wherein the adaptive clock control, based on a number of repeated erroneous executions of an instruction, generates a clock adjusting signal to slow down a clock frequency generated by a clock generator.

15. The processor of claim 9, wherein the frequency variation map for the many-core processor is determined every six months.

16. The processor of claim 9, wherein the frequency variation map for the many-core processor is determined based on humidity.

17. A system comprising:
   a many-core processor including resilient cores; and
   a memory accessible by each resilient core from of the resilient cores for storing a frequency variation map if there is an upgrade to a software application,
   wherein a plurality of tasks is scheduled to execute on respective resilient cores from the resilient cores of the many-core processor in accordance to the frequency variation map, and
   wherein the frequency variation map is determined by:
   dynamically increasing a clock frequency at which the resilient cores execute instructions;
   executing the instructions on the resilient cores;
   monitoring to determine at which clock frequency an error occurs at each resilient core from the resilient cores; and
   constructing the frequency variation map based on a maximum tolerable frequency/voltage ratio for each resilient core from the resilient cores.

18. The system of claim 17, wherein the plurality of tasks are executed on the many-core processor in accordance to a schedule that was created in accordance to the frequency variation map.

19. The system of claim 17, wherein at least one resilient core from the resilient cores includes an instruction pipeline, an error control unit, and an adaptive clock control.

20. The system of claim 17, wherein the frequency variation map for the many-core processor is determined one of (1) every six months, and (2) based on humidity.

* * * * *